United States Patent Office 3,313,144
Patented Apr. 11, 1967

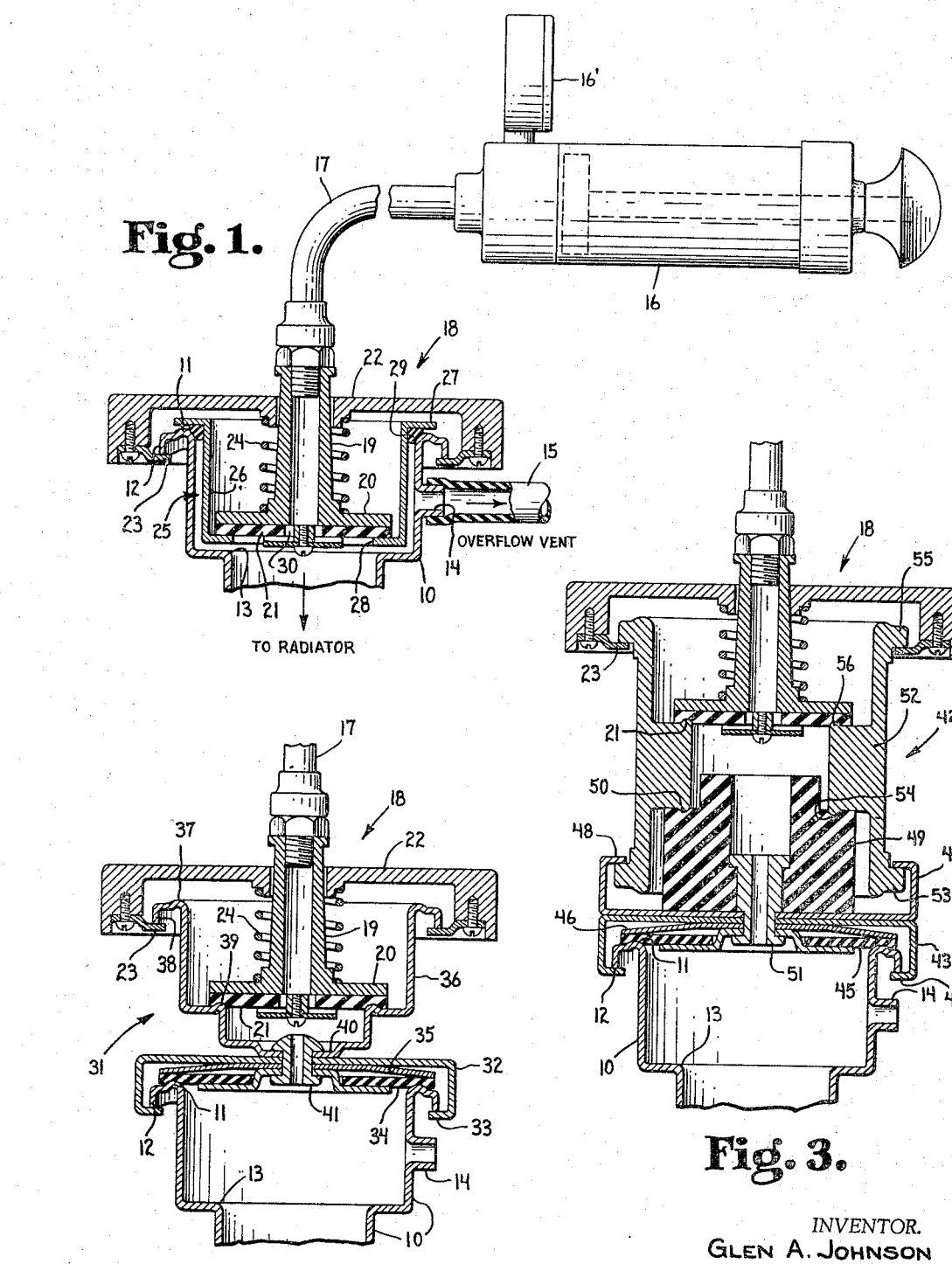

3,313,144
RADIATOR OVERFLOW TUBE TESTER
Glen A. Johnson, Connersville, Ind., assignor to Stant Manufacturing Company, Inc., Connersville, Ind., a corporation of Indiana
Filed July 19, 1965, Ser. No. 472,858
4 Claims. (Cl. 73—49.7)

It is frequently desirable to subject the liquid-circulating cooling system of the internal combustion engine of an automotive vehicle to superatmospheric pressure in order to ascertain whether or not there are leaks in such a system, and if so to locate those leaks. Several forms of apparatus for thus subjecting such systems to testing pressure have been developed and commercialized in recent years, and some of them are disclosed in the following United States patents: R. O. Stromberg, 2,760,367, Aug. 28, 1956; M. J. Enell, 2,847,851, Aug. 19, 1958; W. B. Hughes et al., 2,940,301, June 14, 1960; J. E. Eshbaugh, 2,981,095, Apr. 25, 1961; J. F. Black, 3,014,361, Dec. 26, 1961; G. A. Johnson, 3,035,435, May 22, 1962; R. Mansfield, 3,100,391, Aug. 13, 1963.

As is illustrated in most of the above identified patents, a cooling system of the character here under consideration almost invariably includes a filler neck formed to provide an open mouth surrounded by an outer seat and a cammed lip and to provide an inner seat and an overflow vent disposed between the two seats. In ordinary use, such filler neck is closed by a cap adapted to span the open mouth, provided with a plurality of fingers engageable with the cammed lip to retain the cap in position on the filler neck, gasket means engageable with the outer seat of the filler neck to close the mouth, and a spring pressed valve sealingly engaging the inner seat when the cap is mounted on the filler neck. The structure is such that the spring pressed valve will yield, whenever interior pressure within the system rises above a predetermined value, to place the interior of the system temporarily in communication with the vent port.

Quite obviously, a tester device of the character above suggested must include means sealingly engageable with the inner seat of such a filler neck in order that the desired superatmospheric pressure may be built up within the interior of the system. That means must be of such character that fluid under pressure supplied to the interior of the cooling system cannot have access to the vent port.

Ordinarly, an overflow conduit leads from the vent port to a remote point, usually near the bottom of the engine compartment of the vehicle, where it terminates in an open end. Such ports and the conduits associated therewith do sometimes become clogged; and serious damage can be done to the system under such circumstances. As has been stated above, the valves of conventional radiator caps are designed to yield in response to abnormal pressure in a cooling system, thereby venting such pressure through the vent port and overflow conduit. Obviously, if such port or conduit is clogged, the pressure will not be vented and may build up sufficiently to rupture portions of the cooling system.

So far as I am advised, no means has heretofore been devised whereby, through the use of a conventional cooling system pressure tester, a reading can be taken to determine whether or not the vent port and overflow conduit of such a system is clogged or to determine, even roughly, the degree of such clogging.

The present invention is directed to the provision of such means, and its primary object is to provide an adaptor so constructed and arranged that, when such adaptor is interposed between the filler neck of such a cooling system and a conventional pressure tester, fluid under pressure may be directed to the vent port of the filler neck.

A further object of the invention is to provide such an adaptor in simple, inexpensive, readily usable forms.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 1 is a sectional view of a fragment of a conventional radiator filler neck with the attachment assembly of a known form of pressure tester operatively associated therewith, a preferred form of adaptor constructed in accordance with the present invention being operatively interposed therebetween, and the other portions of the tester being illustrated, somewhat out of proportion, in elevation;

FIG. 2 is a similar view of a radiator filler neck and attachment assembly with a different form of adaptor interposed therebetween; and FIG. 3 is a similar view illustrating still another form of adaptor constructed in accordance with the present invention.

Referring more particularly to FIG. 1, it will be seen that I have illustrated a conventional filler neck indicated generally by the reference numeral 10 and formed to provide an outer seat 11 and a downturned, cammed lip 12 circumscribing the open mouth of said filler neck. The filler neck is further formed to provide an inner seat 13 and a vent or overflow port 14 to which is usually connected an off take hose or pipe 15.

In FIG. 1, I have suggested a pressure tester of for instance, the type illustrated in the above mentioned Johnson Patent 3,035,435, comprising a pump assembly 16 connected by a flexible conduit or hose 17 to an attachment assembly indicated generally by the reference numeral 18. As shown, the conduit 17 is connected to a hollow stem 19 which terminates in a head 20 carrying a sealing gasket 21. A cap-like element 22 is centrally perforated and slidingly sleeved on the stem 19, said element being formed with a peripheral flange which carries a plurality of inturned fingers 23 cooperatively engageable with the cammed lip 12 of the filler neck 10 whereby said attachment assembly may be secured in place on the filler neck. A coiled spring 24 sleeve on the stem 19 is confined between the cap-like element 22 and the head 20 to urge said head downwardly relative to said element 22. In normal usage, the spring 24 is effective to press the gasket 21 sealingly into engagement with the inner seat 13 of the filler neck.

According to the present invention, an adaptor indicated generally by the reference numeral 25 is interposed between the filler neck 10 and the attachment assembly 18. In the form of invention illustrated in FIG. 1, said adaptor comprises an open-ended cup 26 whose external diameter is slightly less than the internal diameter of the mouth of the filler neck 10 and whose length is somewhat less than the dimension by which the inner and outer seats 13 and 11 of the filler neck are axially separated. At its outer end, said cup is formed with an outwardly extending flange 27 which overlies the seat 11 when the cup is in place; and at its inner end, the cup is formed with an inwardly-extending, continuous, annular flange 28 defining a sealing seat. An O-ring 29 or other gasket means is sleeved on the body of the cup to bear against the under surface of the flange 27. With the adaptor 25 in position, when the attachment assembly 18 is mounted on the filler neck, the sealing gasket 21 will be pressed into sealing engagement with the sealing seat 28 of the cup under the influence of the spring 24 which will also press the cup downwardly to squeeze the gasket means 29 between the seat 11 and the flange means 27. Thus, the open mouth of the filler neck 10 is sealed against escape of air supplied to the interior of the system from the pump 16 through the conduit 17, the interior of the stem 19 and the opening 30 through the gasket means 21; and, because the gasket means 21 is held out of contact with the seat 13, air so supplied has free access to the vent port 14 and overflow conduit 15. If pressure builds up in the system as a result of operation of the pump 16, it indicates clogging of the overflow passage; and the rate of such build-up (or the rate of its dissipation after it has been built up, as read on the gauge 16′ associated with the pump 16) furnishes an index as to the degree of clogging. In some instances, it is found that when pressure is so built up to a value somewhat less than a dangerous one, obstructions in the overflow passage will be, at least to some extent, dislodged and blown out. In most instances, however, any build up of pressure in the system resulting from pump operation while the adaptor 25 is in place indicates the necessity for removing and replacing the conduit 15 and mechanically clearing out the vent port 14.

In FIG. 2, I have illustrated a modified form of adaptor 31 interposed between the same filler neck 10 and the same attachment assembly 18.

The adaptor 31 comprises a cap member 32 having fingers 33 for cooperation with the cammed lip 12, and carrying a gasket 34 resiliently pressed into sealing engagement with the seat 11 when the cap is in place on the filler neck by a resilient diaphragm 35. A neck member 36 having an upwardly opening mouth circumscribed by an outer seat 37 and a cammed lip 38 preferably substantially identical with the seat 11 and lip 12 is additionally formed to provide an inner seat 39 similar to the seat 13 and a floor 40 more remote from the seat 37 than is the seat 39. A hollow rivet 41 penetrates registering openings in the neck floor 40, the cap member 32, the diaphragm 35 and the gasket 34 to hold said elements in assembled relation.

In use, the fingers 33 are engaged with the lip 12 of the filler neck 10 to press the gasket 34 into sealing engagement with the seat 11. The fingers 23 of the attachment unit 18 are similarly engaged with the lip 38 of the neck member 36, whereby the gasket 21 carried by the head 20 is pressed into sealing engagement with the seat 39. Now, air supplied by the pump 16 may pass through the hose 17, the hollow stem 19 and the bore of the rivet 41 to the vent port 14, being prevented by the gasket 21 from escaping through the open mouth of the neck member 36 and by the gasket 34 from escaping through the open mouth of the filler neck 10.

Still another form of adaptor 42 is illustrated in FIG. 3 in operative association with the same filler neck 10 and the same attachment assembly 18.

The adaptor 42 comprises a first cap 43 having fingers 44 for engagement with the cammed lip 12 of the filler neck 10, said cap, like the cap 32, carrying a gasket 45 resiliently urged into sealing engagement with the seat 11 by a resilient diaphragm 46. A second, similar cap 47 having fingers 48 is arranged in back-to-back relation with the cap member 43 and carries a compressible gasket means such as the illustrated rubberoid block 49 formed to provide a sealing surface 50 positioned outwardly beyond the fingers 48. A hollow rivet 51 penetrates registering openings in the two caps, the gasket 45 and diaphragm 46 and the compressible gasket means 49 to retain those elements in assembled relation.

An open-ended, tubular body 52 is formed adjacent one end with a cammed flange means 53 engageable with the fingers 48, and with a first internal seat 54 so proportioned and arranged that, when the flange 53 is engaged with the fingers 48, said seat 54 will be pressed into sealing engagement with the sealing surface 50 of the compressible gasket means 49.

Adjacent its opposite end, the body 52 is formed with a second cammed flange means 55 with which may be engaged the fingers 23 of the attachment assembly 18. Near its latter end, the body 52 is formed to provide a second internal seat 56 so proportioned and arranged that, when said fingers 23 are so engaged with the flange means 55, the sealing gasket 21 will be pressed into sealing engagement with said seat 56.

With the parts arranged in the manner illustrated in FIG. 3, fluid under pressure supplied from the pump 16 may flow through the tube 17, the interior of the stem 19 and the bore of the rivet 51 to the vent port 14.

I claim as my invention:

1. For use with:

the filler neck of an automotive vehicle engine cooling system, said filler neck being formed to provide an open mouth circumscribed by an outer seat and a depending, cammed lip, and to provide an inner seat and an overflow vent between said seats, and with a pressure tester device including a cap-like element having means engageable with the lip of such a filler neck to secure said element to such a neck in spanning relation to the mouth thereof, a head associated with said cap-like element and resiliently and sealingly engageable with the inner seat of such a filler neck when said element is so engaged with the lip thereof, and pump means for delivering fluid under pressure through said head;

the invention which comprises means to be interposed between such a cap-like element and such a neck and including means sealingly engaging the outer seat of such a filler neck, and means providing a sealing seat for such a head and restraining said head against sealing association with the inner seat of such a filler neck.

2. For use with:

the filler neck of an automotive vehicle engine cooling system, said filler neck being formed to provide an open mouth circumscribed by an outer seat and a depending, cammed lip, and to provide an inner seat and an overflow vent between said seats, and with a pressure tester device including a cap-like element having means engageable with the lip of such a filler neck to secure said element to such a neck in spanning relation to the mouth thereof, a head associated with said cap-like element and resiliently and sealingly engageable with the inner seat of such a filler neck when said element is so engaged with the lip thereof, and pump means for delivering fluid under pressure through said head;

the invention which comprises an open-ended cup having a body whose external diameter is less than the internal diameter of such a filler neck and whose axial length is less than the dimension between the inner and outer seats of such a filler neck, said cup having external flange means at one end proportioned and designed to overlie the outer seat of such a filler neck and having a continuous, annular flange adjacent its other end defining a sealing seat for such a head, and gasket means surrounding said cup body and engageable between said external flange means and the outer seat of such a filler neck to provide a seal.

3. For use with:

the filler neck of an automotive vehicle engine cooling system, said filler neck being formed to provide an open mouth circumscribed by an outer seat and a depending, cammed lip, and to provide an inner seat and an overflow vent between said seats, and with a pressure tester device including a cap-like element having means engageable with the lip of such a filler neck to secure said element to such a neck in spanning relation to the mouth thereof, a head associated with said cap-like element and resiliently and sealingly engageable with the inner seat of such a filler neck when said element is so engaged with the lip thereof, and pump means for delivering fluid under pressure through said head;

the invention which comprises a cap member associable with such a filler neck to span the open mouth thereof and provided with peripherally-spaced, depending finger means engageable with the lip of such a filler neck to retain said cap member in such association, gasket means carried by said cap member and yieldingly and sealingly engaging the outer seat of such a filler neck when said cap member is in such association, a neck member formed to provide an open mouth circumscribed by an outer seat and a depending, cammed lip, and to provide an inner seat, said neck member having a floor more remote from said outer seat than is said inner seat, the outer seat, cammed lip and inner seat of said neck member corresponding in structure and relationship to the outer seat, cammed lip and inner seat of such a filler neck, said cap member, gasket means and neck member floor being provided with registering openings therethrough, and means securing said cap member to said neck member floor with said cap member lip extending away from said neck member.

4. For use with:

the filler neck of an automotive vehicle engine cooling system, said filler neck being formed to provide an open mouth circumscribed by an outer seat and a depending, cammed lip, and to provide an inner seat and an overflow vent between said seats, and with a pressure tester device including a cap-like element having means engageable with the lip of such a filler neck to secure said element to such a neck in spanning relation to the mouth thereof, a head associated with said cap-like element and resiliently and sealingly engageable with the inner seat of such a filler neck when said element is so engaged with the lip thereof, and pump means for delivering fluid under pressure through said head;

the invention which comprises a cap member associable with such a filler neck to span the open mouth thereof and provided with peripherally-spaced, depending finger means engageable with the lip of such a filler neck to retain said cap member in such association, gasket means carried by said cap member and yieldingly and sealingly engaging the outer seat of such a filler neck when said cap member is in such association, a second cap member substantially identical with said first-named cap member and arranged in back-to-back relation thereto, compressible gasket means carried by said second cap member and having a sealing surface disposed axially beyond the finger means of said second cap member, said first and second cap members, said gasket means and said compressible gasket means being provided with registering openings therethrough and being secured together, and an open-ended, tubular body, said body being formed adjacent one end with first flange means engageable with the finger means of said second cap member and with an inner seat sealably engaging said compressible gasket means when said first flange means is so engaged, and being formed adjacent its opposite end with second flange means engageable by the lip-engaging means of such a cap-like element and with an inner seat sealably engaging the head of such a cap-like element when such a lip-engaging is so engaged.

References Cited by the Examiner
UNITED STATES PATENTS

| 2,760,367 | 8/1956 | Stromberg | 73—40 |
| 2,847,851 | 8/1958 | Enell | 73—40 |
| 2,893,238 | 7/1959 | Kayser | 73—40 |
| 3,035,436 | 5/1962 | Johnson | 73—40 |
| 3,115,031 | 12/1963 | Harry | 73—40 |

LOUIS R. PRINCE, *Primary Examiner.*

J. NOLTON, *Assistant Examiner.*

UNITED STATES PATENT OFFICE
CERTIFICATE OF CORRECTION

Patent No. 3,313,144                                    April 11, 1967

Glen A. Johnson

It is hereby certified that error appears in the above numbered patent requiring correction and that the said Letters Patent should read as corrected below.

Column 2, line 49, for "sleeve" read -- sleeved --; column 6, line 33, after "lip-engaging" insert -- means --.

Signed and sealed this 14th day of November 1967.

(SEAL)
Attest:

Edward M. Fletcher, Jr.                               EDWARD J. BRENNER
Attesting Officer                                          Commissioner of Patents